(12) United States Patent
Kaabouch et al.

(10) Patent No.: US 8,782,433 B2
(45) Date of Patent: Jul. 15, 2014

(54) DATA SECURITY

(75) Inventors: Majid Kaabouch, Rousset (FR); Alexandre Croguennec, Aix en Provence (FR); Carine Lefort, Trets (FR)

(73) Assignee: Inside Secure, Aix-en-Provence, Cedex 3 (FR)

( * ) Notice: Subject to any disclaimer, the term of this patent is extended or adjusted under 35 U.S.C. 154(b) by 1110 days.

(21) Appl. No.: 12/207,983

(22) Filed: Sep. 10, 2008

(65) Prior Publication Data

US 2010/0064144 A1 Mar. 11, 2010

(51) Int. Cl.
*G06F 12/14* (2006.01)
*G06F 21/85* (2013.01)

(52) U.S. Cl.
CPC ............ *G06F 21/85* (2013.01); *G06F 12/1408* (2013.01)
USPC .......................................... 713/190; 710/301

(58) Field of Classification Search
CPC ......... G06F 21/10; G06F 21/12; G06F 21/14; G06F 21/62; G06F 21/72; G06F 21/77; G06F 21/78; G06F 21/85; G06F 12/1408; G06F 2221/2107
USPC ................. 713/189–190, 192–193, 165, 167; 726/26, 27, 30; 380/264, 42–45; 710/301, 310
See application file for complete search history.

(56) References Cited

U.S. PATENT DOCUMENTS

| 4,847,902 | A | 7/1989 | Hampson |
| 5,825,878 | A | 10/1998 | Takahashi |
| 5,982,887 | A | 11/1999 | Hirotani |
| 6,202,152 | B1 * | 3/2001 | Yuenyongsgool et al. ... 713/189 |
| 6,523,118 | B1 * | 2/2003 | Buer .............................. 713/189 |
| 6,669,487 | B1 * | 12/2003 | Nishizawa et al. ............. 439/60 |
| 6,691,210 | B2 * | 2/2004 | Faraboschi et al. ........... 711/135 |
| 6,831,982 | B1 * | 12/2004 | Hughes et al. ................ 380/281 |
| 6,895,506 | B1 * | 5/2005 | Abu-Husein .................. 713/193 |
| 7,039,814 | B2 | 5/2006 | Da Costa |
| 7,283,632 | B2 * | 10/2007 | Woodson ....................... 380/262 |
| 7,627,756 | B2 * | 12/2009 | Fujibayashi et al. .......... 713/165 |
| 8,181,023 | B2 * | 5/2012 | Sugiyama ..................... 713/169 |
| 8,190,921 | B1 * | 5/2012 | Harwood et al. .............. 713/193 |
| 8,218,770 | B2 * | 7/2012 | Arulambalam et al. ....... 380/277 |
| 8,281,388 | B1 * | 10/2012 | Sobel et al. ..................... 726/16 |
| 8,533,494 | B2 * | 9/2013 | Harada .......................... 713/193 |
| 2002/0073326 | A1 * | 6/2002 | Fontijn ........................... 713/190 |
| 2002/0138747 | A1 * | 9/2002 | Clarke ........................... 713/189 |
| 2003/0033537 | A1 * | 2/2003 | Fujimoto et al. .............. 713/193 |
| 2003/0135742 | A1 * | 7/2003 | Evans ............................ 713/189 |
| 2004/0034734 | A1 * | 2/2004 | Boyer ............................ 711/103 |

(Continued)

*Primary Examiner* — Michael Chao
*Assistant Examiner* — Eric W Shepperd
(74) *Attorney, Agent, or Firm* — Panitch Schwarze Belisario & Nadel LLP (57) ABSTRACT

This document discloses data security systems and methods of securing data. A cache memory can be connected between a decryption engine and a central processing unit ("CPU") to increase security of encrypted data that is stored in a datastore. The decryption engine can retrieve the encrypted data from the datastore, decrypt the data, and store the decrypted data in the cache. In turn, the decrypted data can be accessed by the CPU. The data can be encrypted with a secret key, so that decryption can be performed with the secret key. The key can be varied based on a memory address associated with the data. The key can be protected by restricting direct access to the decryption engine by the CPU.

11 Claims, 4 Drawing Sheets

(56) References Cited

U.S. PATENT DOCUMENTS

| | | | |
|---|---|---|---|
| 2004/0133800 A1* | 7/2004 | Sterling | 713/200 |
| 2005/0257070 A1* | 11/2005 | Wen et al. | 713/190 |
| 2006/0036897 A1* | 2/2006 | Lin et al. | 714/5 |
| 2007/0136606 A1* | 6/2007 | Mizuno | 713/189 |
| 2007/0180515 A1* | 8/2007 | Danilak | 726/16 |
| 2007/0245160 A1* | 10/2007 | Benhase et al. | 713/193 |
| 2007/0297610 A1* | 12/2007 | Chen et al. | 380/270 |
| 2008/0107275 A1* | 5/2008 | Asnaashari | 380/281 |
| 2008/0165959 A1* | 7/2008 | Hong et al. | 380/200 |
| 2008/0209203 A1* | 8/2008 | Haneda | 713/150 |
| 2009/0106480 A1* | 4/2009 | Chung | 711/100 |
| 2009/0164780 A1* | 6/2009 | Murayama et al. | 713/165 |
| 2009/0185687 A1* | 7/2009 | Wankmueller et al. | 380/277 |
| 2009/0327758 A1* | 12/2009 | Sakanaka et al. | 713/193 |
| 2010/0046752 A1* | 2/2010 | Fahrny et al. | 380/210 |

* cited by examiner

DATA SECURITY

BACKGROUND

This specification relates to data security.

Devices are being used to store more information electronically. Some of the data being stored is sensitive data. For example, medical records and financial information can be stored in devices to increase accessibility to the information by authorized users. The sensitivity of the data being stored can be considered when determining the type of device and security measures that are implemented to protect the data.

An example device that is used to store information electronically is a Smart card. Smart cards can store information in memory that is embedded in the card. The memory can be used to store sensitive data, such as financial information, medical records, identification information, as well as other sensitive data. Once the memory is stored in the memory of the Smart card, the card can be read by computing devices that are equipped with peripherals that can interface with the Smart cards. Encryption techniques can be used to increase the security of sensitive data in Smart cards Encryption techniques can, for example, transform data based on an encryption key to prevent access to the data without a valid decryption key. However, if unauthorized users obtain the decryption key then the security of the data can be compromised.

SUMMARY

This document discloses data security systems and methods of securing data. Cache memory (e.g., Random Access Memory ("RAM")) can be connected between a decryption engine and a central processing unit ("CPU") to increase security of encrypted data that is stored in a datastore. The decryption engine can retrieve the encrypted data from the datastore, decrypt the data, and store the decrypted data in the cache memory. In turn, the decrypted data can be accessed by the CPU. The data can be encrypted and decrypted with a secret key. The key can be varied based on a memory address associated with the data. The key can be protected by restricting direct access to the decryption engine by the CPU.

Particular implementations of the subject matter described in this specification can be implemented so as to realize one or more of the following advantages. A secret key can be used to enhance data security (e.g., symmetric block ciphers). The secret key can be varied based on a memory address associated with the data. Encrypted data can be identified based on its memory location, thereby resulting in reduced memory overhead. Access to encrypted data can be restricted. Decryption speed can be increased over that realized using a public key. Increased security can be provided for Smart cards and other devices that store sensitive data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document discloses devices, systems, and methods that increase data security capabilities while decreasing memory access times and memory overhead. A system can be implemented with a cache that is connected between a decryption engine and a CPU. A controller can define a portion of a datastore as a memory window. The memory window can be segmented into memory blocks, each memory block having a defined number of bytes. One or more memory blocks can define a sub-window of memory.

When the CPU requests encrypted data, the controller can, for example, retrieve the memory block containing the data and pass the memory block to the decryption engine. The decryption engine can decrypt the memory block and store the decrypted memory block in the cache. In turn, the CPU can retrieve the portion of the decrypted memory block containing the requested data from the cache.

The decrypted memory block can be maintained in the cache until the CPU requests data that is not maintained in the cache. Therefore, if the CPU requests additional data that are maintained in the cache, the CPU can continue to access the data from the cache without waiting for the memory block to be decrypted. The access time of the cache can be faster than that of the datastore. Therefore, the CPU can execute data from the cache faster than the CPU can retrieve data from the datastore, decrypt the data, and execute the data from the cache.

In addition to faster access times, the cache architecture can also increase data security. Stronger encryption methods (e.g., triple data encryption standard "TDES") can be used because larger portions of data (e.g., 16 bytes rather than 1 byte) can be retrieved from the datastore with each fetch. Additionally, the decryption key can be varied for each memory block based, in part, on the sub-window address associated with the memory block.

§1.0 Example Data Security Environment

Figure 1:
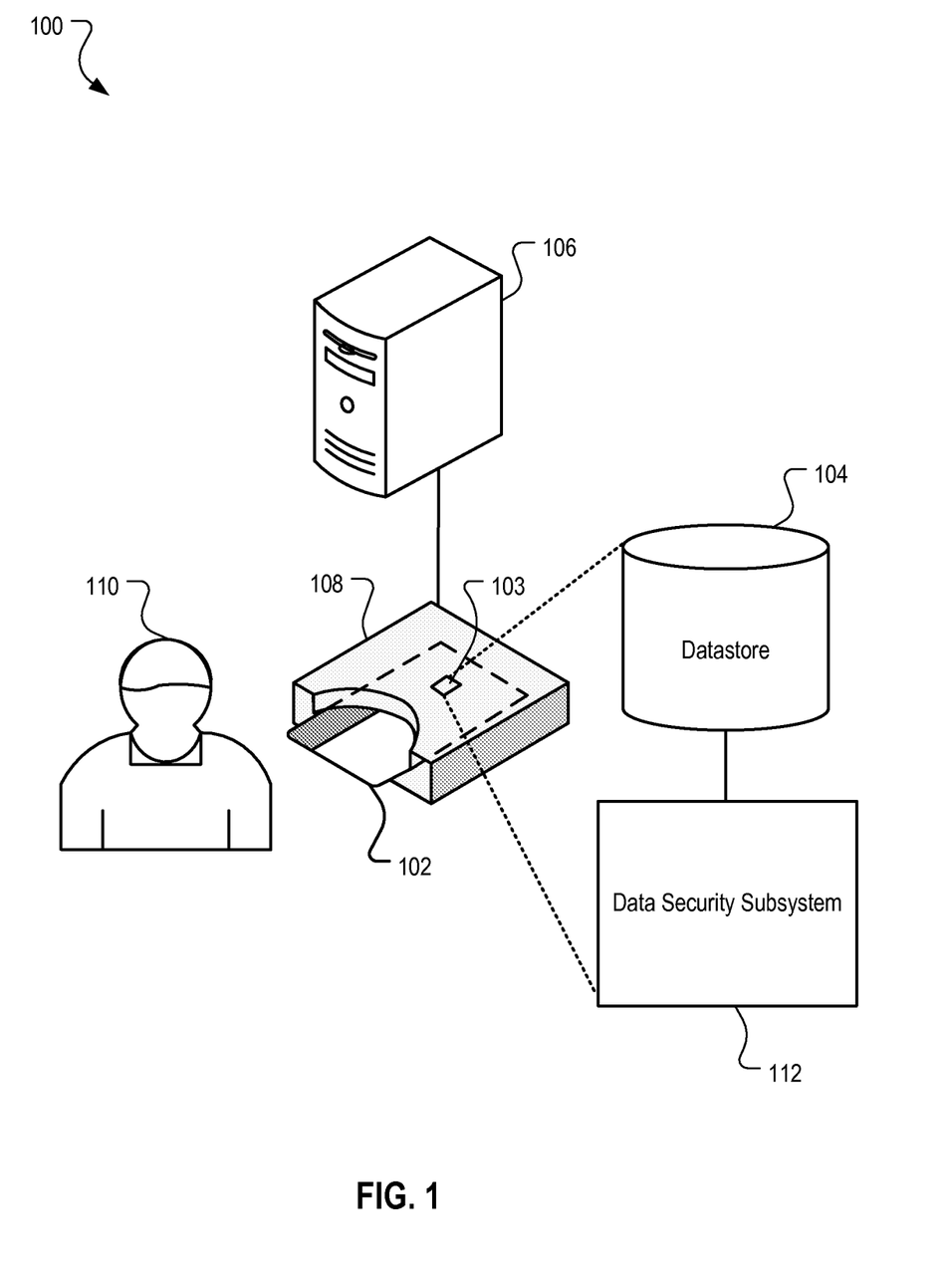
FIG. 1 is a diagram of an example environment in which data security devices, systems, and methods can be implemented.

FIG. 1 is a diagram of an example environment in which data security devices, systems, and methods can be implemented. A Smart card 102 is a card device that can include an embedded integrated circuit chip 103. The integrated circuit chip can include a memory structure, or a secure microcontroller that includes a memory structure, that can operate as a datastore 104. The datastore 104 of the Smart card 102 can store digital information that can be accessed by a computing device 106 that is in communication with the Smart card 102. The computing device 106 can communicate with the Smart card 102 through direct contact with the Smart card 102, or over a wireless connection.

The computing device 106 can be equipped with an interface peripheral 108 (e.g., Smart card reader) to facilitate direct contact with the Smart card 102. A Smart card user 110 can insert the Smart card 102 into the interface peripheral 108. Once the Smart card 102 is inserted, the interface peripheral 108 can make contact with the integrated circuit chip 103. In turn, the computing device 106 can access the datastore 104 or communicate with the microcontroller to store and retrieve data from the datastore 104. Interface peripherals can also have wireless capabilities that facilitate wireless communication with the Smart card 102.

Smart cards 102 can be used in applications that require security to protect the data that is stored on the Smart card 102. For example, Smart cards 102 can be used as credit/debit cards, to store sensitive healthcare data, and to access secure buildings. Therefore, it may be advantageous to prevent unauthorized access to the information stored in the datastore 104. Encryption can be used to protect the data stored in the datastore 104. Encryption can prevent unauthorized access to data, for example, by transforming the data based on an encryption key. In turn, the original data cannot be read without a valid decryption key. Therefore, encrypting data can increase the security of the data.

In some implementations, a data security subsystem 112 can be coupled to the datastore 104 to increase the security of data stored in the datastore 104 and facilitate efficient data management. For example, the data security subsystem 112 can encrypt data that is stored in the datastore 104 to increase the security of the data. Encrypted data is decrypted before it can be executed or otherwise used.

Additionally, the data security subsystem 112 can be operable to define portions of the datastore 104 as memory windows for encrypted data storage to facilitate more efficient memory management. For example, the data security subsystem 112 can identify data as encrypted data based on the data being stored in the memory window of the datastore 104. Therefore, an encryption flag is not required to identify encrypted data.

Identifying data as encrypted based on being stored in the memory window can facilitate more efficient memory use because memory is not required to store the encryption flag. An encryption flag can be a data value that identifies corresponding data as encrypted. The encryption flag can be stored, for example, at a memory location that is associated with the corresponding encrypted data. Identifying encrypted data without the use of an encryption flag can facilitate more efficient use of memory resources because the memory that would be used to store the encryption flag can be used to store additional program instructions or other data.

Data security can also be enhanced based on the architecture of the data security subsystem 112. For example, the data security subsystem 112 can be implemented to restrict access to encrypted data and keys that are used to encrypt/decrypt data in the datastore 104, as discussed below.

§2.0 Example Data Management System

Figure 2:
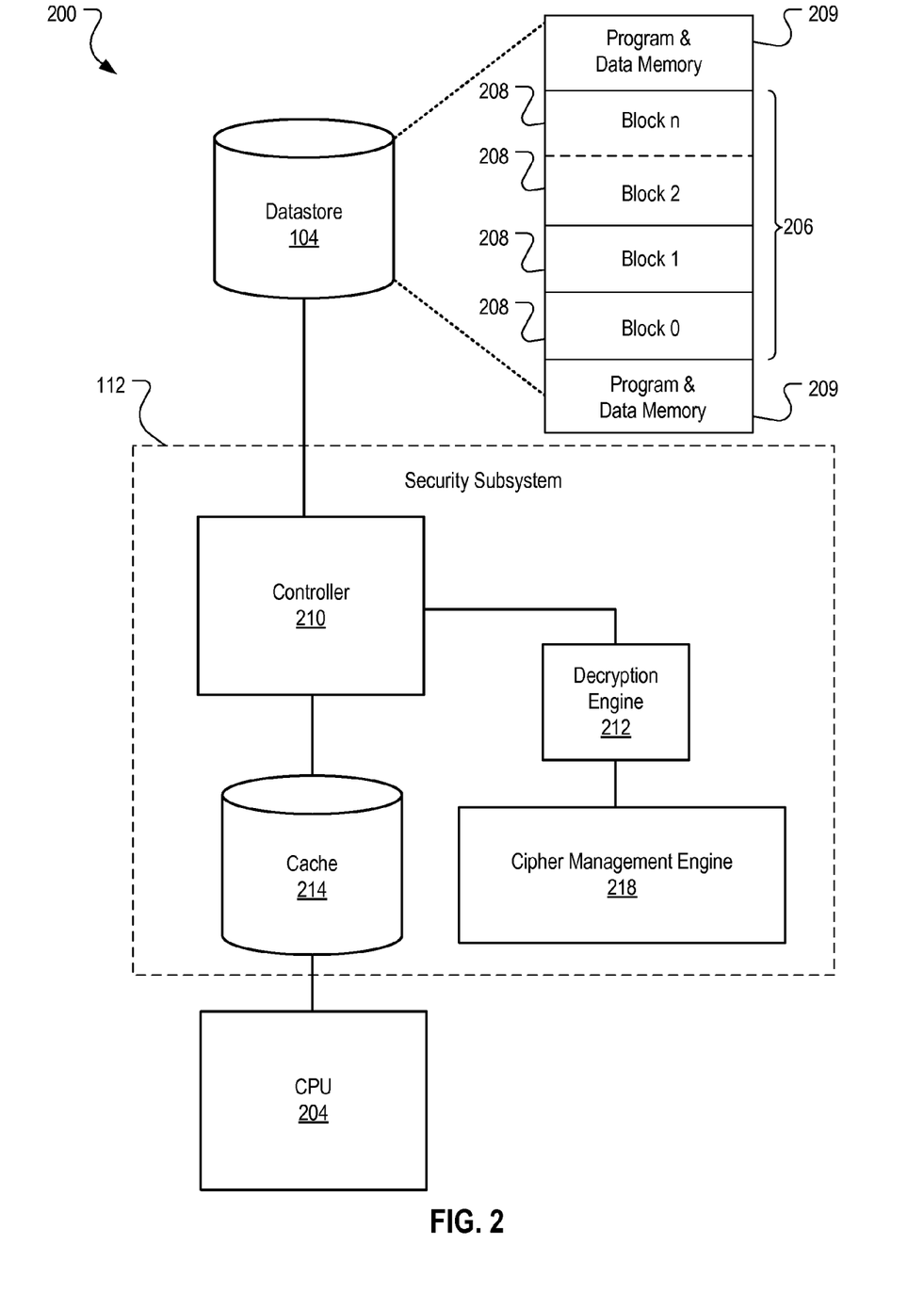
FIG. 2 is a block diagram of an example data management system.

FIG. 2 is a block diagram of an example data management system 200. In some implementations, the data management system 200 can include a datastore 104, a data security subsystem 112, and a CPU 204. The data management system 200 can be implemented, for example, on a Smart card (e.g., Smart card 102 of FIG. 1) or any other device, or system, in which data is secured. The datastore 104 can be implemented, for example, as RAM, read only memory ("ROM"), programmable read only memory ("PROM"), or other suitable memory structures. The CPU 204 can be implemented, for example, as a computer processor, a microcontroller, or any other processing device that can be included on a Smart card (e.g., Smart card 102 of FIG. 1). The data security subsystem 112 can be operable to receive data requests from the CPU 204 and manage access to the data stored in the datastore 104 in response to the requests.

In some implementations, the security subsystem 112 can define a memory window 206 in the datastore 104. The memory window 206 can be a portion of the datastore 104 in which encrypted data can be stored. The data security subsystem 112 can define the memory window 206, for example, based on a start memory address and an end memory address or any other allocation scheme.

The security subsystem 112 can further define one or more memory blocks 208 in the memory window 206. Each memory block 208 can include, for example, 16 bytes of memory. The length of the memory blocks can be based on the length of an encryption key that is used to secure the data, or otherwise on the application. One or more memory blocks can define a memory sub-window. Each memory sub-window can have a corresponding sub-window address that can be used to facilitate encryption/decryption key variation, as discussed below.

In some implementations, the memory window 206 can be used exclusively to store encrypted data. In these implementations, encrypted data can be identified by its memory address rather than an encryption flag. For example, data that is stored at a memory address located within the memory window 206 (e.g., between the start memory address and the end memory address) can be identified as encrypted data. While the memory window 206 is presented as a contiguous set of memory blocks, the memory window 206 can be defined by non-contiguous memory addresses.

§2.1 Example Security Subsystem Encryption/Decryption

In some implementations, the data security subsystem 112 can include a controller 210, a decryption engine 212, and a cache 214. The data security subsystem 112 can also include a cipher management engine 218. The data security subsystem 112 can be coupled to the datastore 104 to manage access to data stored in the datastore 104 by the CPU 204.

In some implementations, the controller 210 can store encrypted data exclusively in the memory window 206. For example, when the controller 210 receives encrypted data, the controller 210 can store the encrypted data in a memory block 208 that has an address within the memory window 206. However, when the controller 210 receives data that is not encrypted, the controller 210 can store the unencrypted data to a memory block 209 that has an address outside the memory window 206.

The data security subsystem 112 can receive a data request (e.g., instruction fetch) from the CPU 204. In response to the request, the controller 210 can retrieve the requested data from the datastore 104. In some implementations, the controller 210 can retrieve a block of data stored in a memory block 208 that contains the data requested by the CPU 204, rather than the portion of the block of data requested. For example, if the requested data corresponds to 1 byte of data in a 16 byte block of memory, the controller 210 can retrieve the entire 16 byte block of data stored in the 16 byte block of memory, rather than just the single byte of data requested by the CPU 204. The controller 210 can pass retrieved data to the decryption engine 212 if the retrieved data is encrypted or to the cache 214 if the retrieved data is not encrypted.

In some implementations, the controller 210 can determine whether the retrieved data is encrypted based on an address associated with the retrieved data. For example, the controller 210 can identify the memory address associated with the retrieved data. If the memory address corresponds to an address that is included in the memory window 206, then the controller 210 can determine that the data is encrypted. If the memory address does not correspond to an address that is included in the memory window 206, the controller 210 can determine that the data is not encrypted. In turn, if the controller determines that the retrieved data is encrypted, the controller 210 can pass the data to the decryption engine 212. If the controller 210 determines that the retrieved data is not encrypted, the controller 210 can pass the retrieved data directly to the cache 214.

The decryption engine 212 can receive encrypted data from the controller 210 and decrypt the data using a decryption key. In some implementations, the decryption key can be a secret key, rather than a public key. A secret key is an encryption key that is not publicly available, for example, through a certificate authority. A secret key can be initialized in a device, for example, during manufacturing. When a secret key is used to encrypt data, the same secret key must be used to decrypt the data. Therefore, only devices having access to (e.g., initialized with) the secret key can be used to decrypt the data.

Because the secret key is resident in devices that are authorized to access data encrypted with the secret key, these devices are not required to access, for example, a certificate authority to obtain the key. Therefore, decryption can be performed more quickly with secret keys than public keys. In turn, data encrypted with a secret key can be accessed by authorized devices more quickly than data encrypted with public keys.

The strength of an encryption/decryption key can depend, in part, on the length of the key used. However, the length of the key that can be used can depend, in part, on the size of the data that is encrypted. For example, 16 bytes of data can be encrypted with a longer key than 1 byte of data. Therefore, the encryption algorithm used to encrypt 16 bytes of data using the longer key can be stronger than the encryption algorithm used to encrypt 1 byte of data. In some implementations, memory blocks 208 can be defined to have a length that corresponds to the encryption/decryption algorithm to be used to secure the data.

A symmetric block cipher key is an example of a key that can be used to encrypt a 16 byte block of data. The symmetric block cipher can be a cipher that conforms to the data encryption standard (DES), triple data encryption standard (Triple-DES), or advanced encryption standard (AES).

In some implementations, the security subsystem 112 can include a cipher management engine 218. The cipher management engine 218 can generate a key that is varied from a base secret key according to the location to which data is stored within the memory window 206. The key can be derived, for example, by applying a function to the base secret key and the address associated with the data location in the memory window 206. When the encrypted data is retrieved by the controller 210 and passed to the decryption engine 212 to be decrypted with a decryption algorithm. The decryption algorithm uses the same key that was used to encrypt the data. The decryption key can be retrieved, for example, from the cipher management engine 218. In turn, the decryption engine 212 can use the decryption key to decrypt the data. In some implementations, the decryption engine 212 can be operable to determine the decryption key based on the function and the sub-window address.

Once the data retrieved from the block of memory 208 have been decrypted, the decrypted block of data is stored in the cache 214. The cache 214 can be a volatile memory that is accessible by the CPU 204. For example, the cache 214 can be a RAM memory structure. Once the decrypted data is available in the cache 214, the CPU 204 can retrieve the decrypted data that it requested from the cache 214.

In some implementations, the cache 214 can maintain the decrypted data until the CPU requests data that is stored in another block of memory 208. For example, if a first data request from the CPU 204 requests a byte of data that is located in block 0, then the encrypted data stored in block 0 can be decrypted, as described above, and stored in the cache 214 for access by the CPU 204. If a second data request from the CPU 204 requests another byte of data that is located in block 0, then the cache 214 can maintain the decrypted data. Thus, the data in block 0 does not need to be decrypted again and the CPU 204 can directly access the decrypted data in cache 214. However, if the second data request from the CPU 204 requests data that is located in a block of memory 208 other than block 0 (e.g., block 1), then the data from block 1 can be retrieved and decrypted as described above. In this situation, the cache 214 can discard the decrypted data from block 0 in response to the second data request.

Maintaining the decrypted data in the cache 214 until data from another memory block 208 is requested can increase data access time. The access times associated with the cache 214 are generally faster than those associated with the datastore 104. Therefore, operations can be executed more quickly from the cache 214 than the datastore 104. Additionally, maintaining the decrypted data in the cache 214 enables access to the data without waiting for the decryption process to be performed. This can further increase access time to data that has been decrypted and is maintained in the cache 214.

§2.2 Example Architecture Based Security

In some implementations, the architecture of the data management system 200 can enhance data security. FIG. 2 illustrates an example architecture for the data management system 200 that can be used to increase data security. As shown in FIG. 2, the CPU 204 is connected to the cache 214. However, CPU 204 is independent of (e.g., not connected to, or in direct communication with) the datastore 104, the decryption engine 212, or the cipher management engine 218.

In some implementations, connecting the CPU 204 to the cache 214 can increase security of encrypted data. When CPU 204 is connected to the cache 214 the CPU 204 can be limited to executing instructions maintained in the cache 214. Therefore, the CPU 204 cannot execute data directly from the memory store 104. Accordingly, the CPU 204 cannot download an entire program from the datastore 104. Similarly, the CPU 204 cannot use the encrypted version of the data and the unencrypted version of the data to determine the encryption key. Thus, incorporating a cache 214 between the datastore 104 and the CPU 204 facilitates increased data security.

In some implementations, the CPU 204 can be implemented independent of the decryption engine 212. In these implementations, CPU 204 access to the decryption engine can be restricted and the controller 210 can independently manage data decryption. By restricting access to the decryption engine 212, the CPU 204 cannot identify the secret key by accessing the decryption engine 212. Similarly, the CPU 204 cannot learn the function that is used to vary the secret key by accessing the decryption engine 212. Additionally, because the decryption engine 212 is independent of the CPU 204, the CPU 204 cannot disable decryption. Therefore, the CPU 204 cannot gain access to the encrypted data through the cache 214.

§3.0 Example Process Flow

Figure 3:
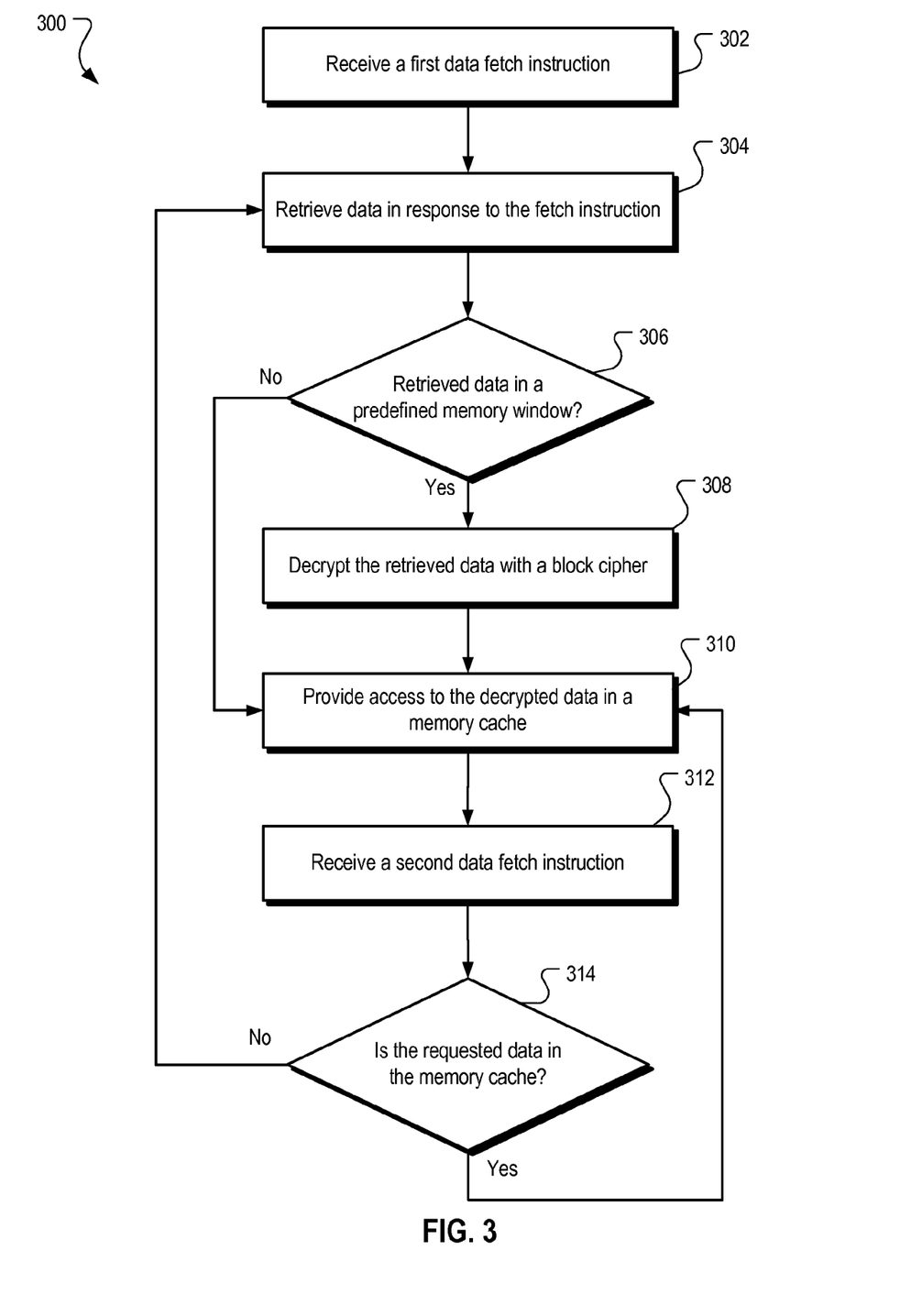
FIG. 3 is a flow chart of an example process of securing data.

FIG. 3 is a flow chart of an example process 300 of securing data. The process 300 can be implemented, for example, in the security subsystem 112 and/or data management system 200.

Stage 302 receives a first data fetch instruction. In some implementations, the first data fetch instruction can be a request for data that is stored in a datastore. The first data fetch instruction can be received from a computing device (e.g., computer, server, CPU, etc). The first data fetch instruction can be received, for example, by the security subsystem 112.

Stage 304 retrieves data in response to the fetch instruction. The data can be located, for example, in a memory sub-window. The block of data can be encrypted with a cipher that is based on a memory sub-window address and a secret key. The cipher can satisfy, for example, a data encryption standard, a triple data encryption standard, or an advanced encryption standard block cipher. The data can be retrieved, for example, by the controller 210.

Stage 306 determines whether the retrieved data is stored in a predefined memory window. In some implementations, data stored in the predefined memory window is encrypted. The predefined memory window can be defined by a start memory address and an end memory address. Encrypted data can be stored exclusively in the predefined memory window. If the data is not stored in the predefined memory window, then the process 300 can continue to stage 310. If the data is stored in the predefined memory window, then the process can continue to stage 308.

Stage 308 decrypts the retrieved data with a cipher. In some implementations, the cipher can be based on the sub-window address of the data and a secret key. The data can be decrypted, for example, by the decryption engine 212.

Stage 310 provides access to the decrypted data in a memory cache. In some implementations, the memory cache is independent of the predefined memory window. Access to the data can be provided, for example, by the cache 214.

Stage 312 receives a second data fetch instruction. In some implementations, the second fetch instruction can be a request for data that is stored in a datastore. The second data fetch instruction can be received from a computing device. The second data fetch instruction can be received, for example, by the security subsystem 112.

Stage 314 determines whether the data requested by the second data fetch instruction is in the memory cache. If the requested data is in the memory cache, the process 300 can continue to stage 310. If the requested data is not in the memory cache, the process 300 can continue to stage 304.

Figure 4:
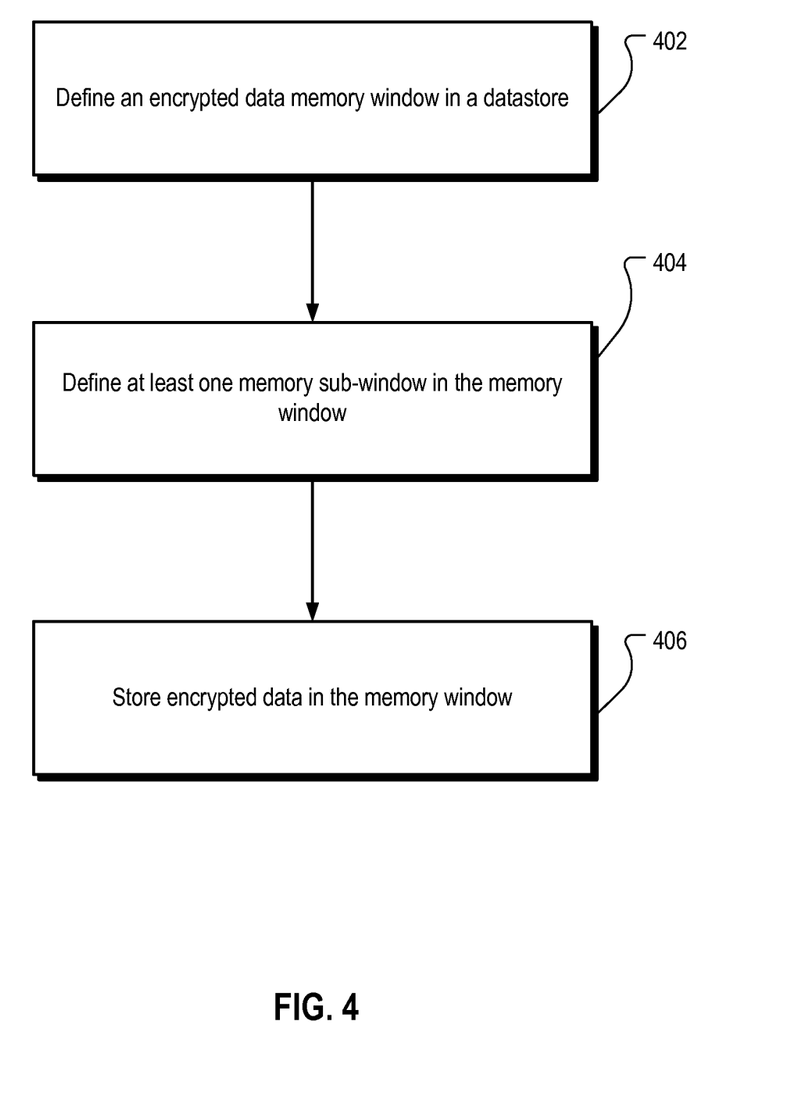
FIG. 4 is a flow chart of an example process of managing memory.

FIG. 4 is a flow chart of an example process 400 of managing memory. The process 400 can be implemented, for example, in the security subsystem 112 and/or data management system 200.

Stage 402 defines an encrypted data memory window in a datastore. In some implementations, the memory window can be used to store encrypted data. The memory window can be defined, for example, by the controller 210.

Stage 404 defines at least one memory sub-window in the memory sub-window. In some implementations, each memory sub-window can include one or more memory blocks. Each memory block can have a length that is defined by a length of an encryption data size used to encrypt the data stored in the memory block. The memory sub-window can be defined, for example, by the controller 210.

Stage 406 stores encrypted data in the memory window. In some implementations, the encrypted data can be encrypted with an encryption key that is based on a memory sub-window address. The memory sub-window address can correspond to the memory location to which the data is stored. Data can be identified as being encrypted based on being stored in the memory window. The encrypted data can be stored in the memory window, for example, by the controller 210.

While this document contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while process steps are depicted in the drawings in a particular order, this should not be understood as requiring that such process steps be performed in the particular order shown or in sequential order, or that all illustrated process steps be performed, to achieve desirable results.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results.

What is claimed is:

1. A data security system, comprising:
a first datastore storing encrypted data;
a second datastore connectable to an external processing unit;
a controller serially connected between the first datastore and the second datastore, the second datastore being serially connected between the controller and the external processing unit; and
a decryption engine coupled to the controller, the decryption engine including at least one processor and being configured to obtain at least a portion of the encrypted data from the controller and decrypt the portion of the encrypted data; the decryption engine being connected to the controller in a manner that prevents the external processing unit from accessing the decryption engine, wherein the controller is connected between the decryption engine and each of the first datastore and the second datastore, and wherein the controller is configured to:
receive data requests when data requested by the external processing unit are not stored in the second datastore,
obtain from the first datastore first data corresponding to the requested data,
determine whether the first data are encrypted based on whether the requested data are stored in a first memory window in the first datastore, and
if the first data are encrypted, provide the first data to the decryption engine obtain from the decryption engine decrypted data corresponding to the first data, and store the decrypted data in the second datastore to make the decrypted data directly accessible to the external processing unit, and
if the first data are not encrypted, store the first data in the second datastore without providing the first data to the decryption engine.

2. The data security system of claim 1, further comprising a cipher management engine including at least one processor, the cipher management engine being configured to generate an encryption key for a memory sub-window based on an address of the memory sub-window and a secret key, wherein the cipher management engine is configured to generate a unique decryption key for each memory sub-window, the cipher management engine being connected to the controller in a manner that prevents the controller from directly accessing the cipher management engine.

3. The data security system of claim 1, wherein: the second datastore is inaccessible by the decryption engine.

4. The data security system of claim 1, wherein the controller is further configured to define a start address and an end address of the first memory window in the first datastore, the first memory window being a portion of memory in which the encrypted data are stored, and determine whether the data obtained from the first datastore are encrypted based on whether an address of the requested data is between the start address and the end address of the memory window.

5. The data security system of claim 1, wherein the first datastore, the decryption engine, and the second datastore are implemented on a Smart card.

6. The data security system of claim 1, wherein the first data is contained in a data block, the controller being configured to perform the obtaining, determining, providing, decrypting, and storing operations on the entire data block containing the first data.

7. A method comprising:
storing encrypted data in a first datastore of a data security system;
receiving data requests when data requested by an external processing unit are not stored in a second datastore of the data security system, the second datastore being accessible to the external processing unit;
obtaining from the first datastore encrypted first data corresponding to the requested data;
determining whether the first data are encrypted based on whether the requested data are stored in a first memory window of the first datastore;
if the first data are encrypted, providing the first data to a decryption engine of the data security system, the decryption engine being inaccessible to the external processing unit, obtaining from the decryption engine decrypted data corresponding to the first data, and storing the decrypted data in the second datastore to make the decrypted data directly accessible to the external processing unit; and
if the first data are not encrypted, storing the first data in the second datastore without providing the first data to the decryption engine.

8. The method of claim 7, wherein the first data are retrieved from a memory sub-window of the first memory window in the first datastore, the method further comprising:
generating by a cipher management engine, a decryption key for the memory sub-window based on a secret key and an address of the memory sub-window, and
using the decryption key by the decryption engine to decrypt the first data,
wherein the decryption key is unique for each memory sub-window of the first memory window, the cipher management engine including at least one processor and being accessible only to the decryption engine.

9. The method of claim 7, wherein the first memory window is defined by a start and an end address, and determining whether the first data are encrypted comprises determining whether an address of the first data is between the start address and the end address of the first memory window.

10. The method of claim 7, wherein data retrieved in the first datastore is identified as encrypted based on an address of the data.

11. The method of claim 7, wherein the obtaining, determining, providing, decrypting, and storing operations are performed on the entire data block containing the first data.

* * * * *